(12) United States Patent
Schnaitter

(10) Patent No.: US 7,108,420 B1
(45) Date of Patent: Sep. 19, 2006

(54) SYSTEM FOR ON-CHIP TEMPERATURE MEASUREMENT IN INTEGRATED CIRCUITS

(75) Inventor: William N. Schnaitter, San Ramon, CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 10/961,311

(22) Filed: Oct. 7, 2004

Related U.S. Application Data

(63) Continuation of application No. 10/411,955, filed on Apr. 10, 2003.

(51) Int. Cl.
G01K 7/00 (2006.01)

(52) U.S. Cl. ...................... 374/168; 327/539
(58) Field of Classification Search .................. 327/87, 327/73, 539; 374/168, 183
See application file for complete search history.

(56) References Cited

U.S. PATENT DOCUMENTS

| | | | |
|---|---|---|---|
| 3,812,717 A | 5/1974 | Miller et al. | |
| 4,004,462 A | 1/1977 | Dobkin | |
| 4,071,813 A | 1/1978 | Dobkin | |
| 4,224,537 A | 9/1980 | Glazer | |
| 4,280,091 A * | 7/1981 | Hiltner | 323/315 |
| 4,608,530 A * | 8/1986 | Bacrania | 323/315 |
| 5,094,546 A | 3/1992 | Tsuji | |
| 5,493,205 A | 2/1996 | Gorecki | |
| 5,585,748 A | 12/1996 | Yamaguchi et al. | |
| 5,623,232 A | 4/1997 | Halbert et al. | |
| 5,639,163 A | 6/1997 | Davidson et al. | |
| 6,008,685 A * | 12/1999 | Kunst | 327/512 |
| 6,019,508 A | 2/2000 | Lien | |
| 6,028,472 A * | 2/2000 | Nagumo | 327/512 |
| 6,052,020 A * | 4/2000 | Doyle | 327/539 |
| 6,055,489 A * | 4/2000 | Beatty et al. | 702/130 |
| 6,075,407 A * | 6/2000 | Doyle | 327/539 |
| 6,111,397 A * | 8/2000 | Leung | 323/315 |
| 6,140,860 A * | 10/2000 | Sandhu et al. | 327/513 |
| 6,147,548 A * | 11/2000 | Doyle | 327/539 |
| 6,149,299 A | 11/2000 | Aslan et al. | |
| 6,275,098 B1 * | 8/2001 | Uehara et al. | 327/539 |
| 6,281,743 B1 * | 8/2001 | Doyle | 327/539 |
| 6,304,109 B1 | 10/2001 | Brokaw | |
| 6,489,835 B1 * | 12/2002 | Yu et al. | 327/539 |
| 6,554,469 B1 | 4/2003 | Thomson et al. | |
| 6,563,371 B1 * | 5/2003 | Buckley et al. | 327/539 |
| 6,567,763 B1 * | 5/2003 | Javanifard et al. | 702/130 |
| 6,650,173 B1 * | 11/2003 | Khouri et al. | 327/538 |

(Continued)

FOREIGN PATENT DOCUMENTS

EP    0401280    2/1994

*Primary Examiner*—G. Bradley Bennett

(57) ABSTRACT

A thermal sensor providing simultaneous measurement of two diodes. A first diode and a second diode are coupled to a first current source and a second current source, respectively. The ratio of the currents provided by the two sources is accurately known. The voltage across each of the two diodes may be coupled to the input of a differential amplifier for determination of temperature. Alternatively, the first diode may be coupled to a first current source by a resistor with a known voltage drop, and the second diode may be coupled to an adjustable second current source. The current in the second diode may be adjusted until the voltage across the second diode is equal to the sum of voltage drop across the first diode and the known voltage drop across the resistor. Under the established conditions, the Diode Equation may be used to calculate a temperature.

12 Claims, 6 Drawing Sheets

U.S. PATENT DOCUMENTS

| | | |
|---|---|---|
| 6,717,449 B1 * | 4/2004 | Tamiya et al. .............. 327/308 |
| 2002/0014675 A1 | 2/2002 | Matsumoto et al. |
| 2003/0035463 A1 | 2/2003 | Breinlinger |
| 2003/0214998 A1 | 11/2003 | Gauthier et al. |
| 2004/0105488 A1 | 6/2004 | Felder |

* cited by examiner

200

201

| d1 | d2 | d1 | d2 | d1 | d2 | d1 | d2 | d1 | d2 | d1 | d2 | d1 | d2 | d1 | d2 |
|----|----|----|----|----|----|----|----|----|----|----|----|----|----|----|----|
| d2 | d1 | d2 | d1 | d2 | d1 | d2 | d1 | d2 | d1 | d2 | d1 | d2 | d1 | d2 | d1 |
| d1 | d2 | d1 | d2 | d1 | d2 | d1 | d2 | d1 | d2 | d1 | d2 | d1 | d2 | d1 | d2 |
| d2 | d1 | d2 | d1 | d2 | d1 | d2 | d1 | d2 | d1 | d2 | d1 | d2 | d1 | d2 | d1 |
| d1 | d2 | d1 | d2 | d1 | d2 | d1 | d2 | d1 | d2 | d1 | d2 | d1 | d2 | d1 | d2 |
| d2 | d1 | d2 | d1 | d2 | d1 | d2 | d1 | d2 | d1 | d2 | d1 | d2 | d1 | d2 | d1 |
| d1 | d2 | d1 | d2 | d1 | d2 | d1 | d2 | d1 | d2 | d1 | d2 | d1 | d2 | d1 | d2 |
| d2 | d1 | d2 | d1 | d2 | d1 | d2 | d1 | d2 | d1 | d2 | d1 | d2 | d1 | d2 | d1 |
| d1 | d2 | d1 | d2 | d1 | d2 | d1 | d2 | d1 | d2 | d1 | d2 | d1 | d2 | d1 | d2 |
| d2 | d1 | d2 | d1 | d2 | d1 | d2 | d1 | d2 | d1 | d2 | d1 | d2 | d1 | d2 | d1 |
| d1 | d2 | d1 | d2 | d1 | d2 | d1 | d2 | d1 | d2 | d1 | d2 | d1 | d2 | d1 | d2 |
| d2 | d1 | d2 | d1 | d2 | d1 | d2 | d1 | d2 | d1 | d2 | d1 | d2 | d1 | d2 | d1 |
| d1 | d2 | d1 | d2 | d1 | d2 | d1 | d2 | d1 | d2 | d1 | d2 | d1 | d2 | d1 | d2 |
| d2 | d1 | d2 | d1 | d2 | d1 | d2 | d1 | d2 | d1 | d2 | d1 | d2 | d1 | d2 | d1 |
| d1 | d2 | d1 | d2 | d1 | d2 | d1 | d2 | d1 | d2 | d1 | d2 | d1 | d2 | d1 | d2 |
| d2 | d1 | d2 | d1 | d2 | d1 | d2 | d1 | d2 | d1 | d2 | d1 | d2 | d1 | d2 | d1 |

| d1 | d2 | d1 | d2 |
|---|---|---|---|
| d2 | d1 | d2 | d1 |

| d1 | d2 | d1 | d2 | d1 | d2 | d1 | d2 | d1 | d2 | d1 | d2 |
|---|---|---|---|---|---|---|---|---|---|---|---|
| d2 | d1 | d2 | d1 | d2 | d1 | d2 | d1 | d2 | d1 | d2 | d1 |
| d1 | d2 | d1 | d2 | d1 | d2 | d1 | d2 | d1 | d2 | d1 | d2 |
| d2 | d1 | d2 | d1 | d2 | d1 | d2 | d1 | d2 | d1 | d2 | d1 |

| d1 | d2 | d1 | d2 | d1 | d2 | d1 | d2 | d1 | d2 | d1 | d2 | d1 | d2 |
|---|---|---|---|---|---|---|---|---|---|---|---|---|---|
| d2 | d1 | d2 | d1 | d2 | d1 | d2 | d1 | d2 | d1 | d2 | d1 | d2 | d1 |
| d1 | d2 | d1 | d2 | d1 | d2 | d1 | d2 | d1 | d2 | d1 | d2 | d1 | d2 |
| d2 | d1 | d2 | d1 | d2 | d1 | d2 | d1 | d2 | d1 | d2 | d1 | d2 | d1 |

| d1 | d2 | d1 | d2 | d1 | d2 | d1 | d2 | d1 | d2 | d1 | d2 |
|---|---|---|---|---|---|---|---|---|---|---|---|
| d2 | d1 | d2 | d1 | d2 | d1 | d2 | d1 | d2 | d1 | d2 | d1 |
| d1 | d2 | d1 | d2 | d1 | d2 | d1 | d2 | d1 | d2 | d1 | d2 |
| d2 | d1 | d2 | d1 | d2 | d1 | d2 | d1 | d2 | d1 | d2 | d1 |

| d1 | d2 | d1 | d2 |
|---|---|---|---|
| d2 | d1 | d2 | d1 |

FIGURE 2B

SYSTEM FOR ON-CHIP TEMPERATURE MEASUREMENT IN INTEGRATED CIRCUITS

RELATED APPLICATIONS

This application is a Continuation of co-pending commonly-owned U.S. patent application Ser. No. 10/411,955, filed Apr. 10, 2003, entitled "System For On-Chip Temperature Measurement In Integrated Circuits" to Schnaitter. This case is related to co-pending commonly-owned U.S. patent application Ser. No. 10/824,702, filed Apr. 14, 2004, entitled "System For On-Chip Temperature Measurement In Integrated Circuits" to Schnaitter.

FIELD OF THE INVENTION

Embodiments of the present invention relate to temperature measurement of integrated circuits. In particular, embodiments of the present invention relate to an on-chip temperature sensor for integrated circuits.

BACKGROUND ART

Temperature measurement in semiconductor devices such as integrated circuits on silicon substrates is often done by taking advantage of the fundamental relationship between the saturation current of a p-n junction and its temperature. This relationship is described by the Diode Equation shown below:

$$I = I_S * [\exp(qV/nkT) - 1]$$

where,
 $I_S$ = saturation current
 q = electron charge
 V = p-n junction voltage
 n = ideality factor (between 1 and 2)
 k = Boltzmann's constant
 T = absolute temperature (K)

The ideality factor n is equal to 2 for pure recombination current (low voltage, low current density), and equal to 1 for pure diffusion current (higher voltages). When using a p-n junction as a temperature sensor, it is desirable that n be close to 1. However, high current densities should be avoided to minimize ohmic effects due to series resistances outside of the p-n junction. Ohmic effects can lead to a deviation from the Diode Equation.

FIG. 1 shows a conventional thermal sensor 100. A current source 105 with a single diode 110 is used, with sequential measurements being taken for current and voltage to obtain two I-V data pairs $(I_1, V_1)$ and $(I_2, V_2)$ for the diode 110. The temperature T is then calculated (neglecting the −1) from the Diode Equation as follows:

$$T = (q/nk) * (V_2 - V_1) / (\ln(I_2/I_1))$$

The (−1) term in the Diode Equation may be ignored since the resulting error is usually less than 1 part in 100,000 for all current densities of interest.

In conventional temperature measurements made using a single diode, there are a number of error sources that reduce the accuracy and reliability of the measurements. Also, the sequential measurements reduce the frequency with which measurements can be made.

In the measurement of the two voltages, the error associated with each individual measurement contributes to the total error for the term $(V_2 - V_1)$. Since this term is normally quite small (about one tenth of $V_2$ or $V_1$), the accuracy of the voltage measurements is critical. Also, voltage measurements usually involve an analog-to-digital conversion, with an associated quantization error that is counted twice.

Another source of error are leakage currents. For example, shunt resistance 120 may produce a deviation from the I-V characteristic expressed by the Diode Equation. Also, since the measurements are sequential, short term changes in the circuit state can affect the measurements. As previously described, a series resistance 115 may also introduce error.

SUMMARY OF INVENTION

Thus, a need exists for a more accurate temperature sensor for integrated circuits. There is also a need for a temperature sensor that eliminates the problems associated with sequential electrical measurements, as well as providing reduced errors, reduced noise, and an increased measurement frequency.

Accordingly, embodiments of the present invention provide on-chip temperature sensing through simultaneous electrical measurement of a plurality of diodes. The simultaneous measurement of more than one diode eliminates the need for sequential measurements and reduces quantization error.

In an embodiment of the present invention, two diodes are each coupled to a controlled current source. The ratio of the currents provided by the two sources is accurately known. The voltage across each of the two diodes is coupled to the input of a differential amplifier. The output of the differential amplifier may be coupled to an analog-to-digital converter.

In another embodiment, a first diode is coupled to a first current source by a resistor with a known voltage drop, and a second diode is coupled to an adjustable second current source. The current in the second diode is adjusted until the voltage across the second diode is equal to the sum of voltage drop across the first diode and the known voltage drop across the resistor. Under the established conditions, the Diode Equation may be used to calculate a temperature.

Although the above embodiments describe the use of two diodes in parallel, three or more diodes may be used in parallel, with or without coupling resistors. The additional measurements may be used to further reduce error.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should not be understood as being drawn to scale except if specifically noted.

Prior Art

FIG. 2A shows a schematic diagram for a square layout of two diodes in accordance with an embodiment of the present claimed invention.

FIG. 2B shows a schematic diagram for an approximate circular layout of two diodes in accordance with an embodiment of the present claimed invention.

DESCRIPTION OF THE PREFERRED EMBODIMENTS

In the following detailed description of the present invention, a system for on-chip temperature measurement in an integrated circuit, numerous specific details are set forth in order to provide a thorough understanding of the present invention. However, it will be obvious to one skilled in the art that the present invention may be practiced without these specific details. In other instances well known methods involving photolithography, ion implantation, deposition and etch, etc., and well known circuit components such as current sources and amplifiers, etc., have not been described in detail so as not to unnecessarily obscure aspects of the present invention.

FIG. 2A shows a substrate layout pattern 200 for a first diode and a second diode in accordance with an embodiment of the present invention. The first diode comprises an array of discrete diode elements d1 and the second diode comprises an array of discrete diode elements d2. Separate interconnects may be fabricated to achieve parallel electrical connection between diodes d1, and between diodes d2.

In general, the diode arrays d1 and d2 are preferably laid out in an area with a small area moment (e.g. a square or a circle). A compact layout on the surface of the integrated circuit minimizes the overall spatially related variations between the diodes. It is also desirable that each of the diode arrays have a common centroid.

In a preferred embodiment, the exemplary pattern of FIG. 2A comprises 128 d1 diodes and 128 d2 diodes laid out in a square with a dimension of about 85 microns.

In achieving the desired layout, a sub-array 201 that has a common centroid and compact area, may be used as a tile to build the overall area for the two diodes.

FIG. 2B shows an approximate circular substrate layout pattern 205 that comprises the sub-array 201 of FIG. 2A. It is desirable that the total diode array have a shape that has two or more axes of symmetry.

Figure 1:
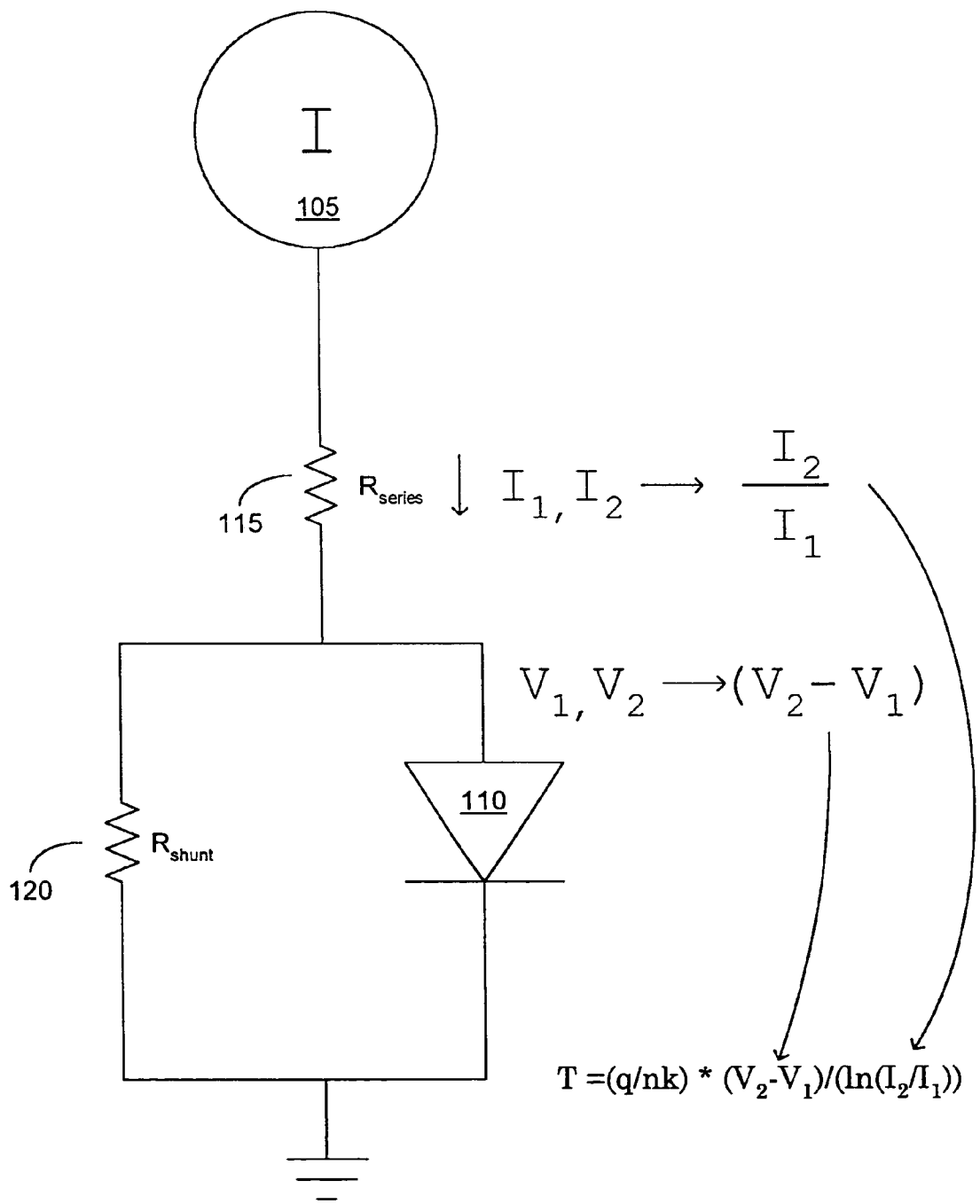
FIG. 1 shows a thermal sensor with a single diode.
Figure 3A:
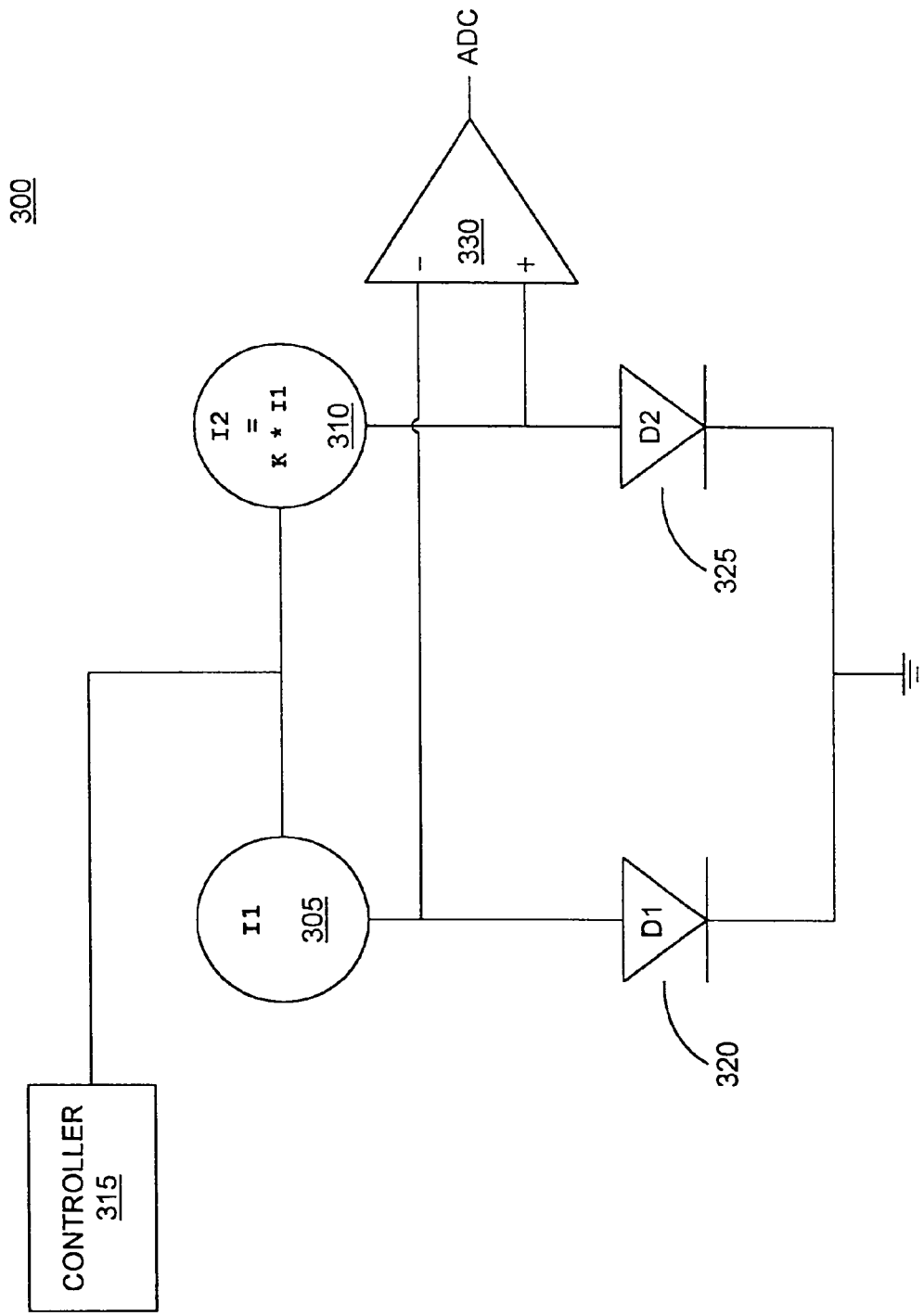
FIG. 3A shows a dual-diode thermal sensor, in accordance with an embodiment of the present claimed invention.

FIG. 3A shows a dual-diode thermal sensor 300, in accordance with an embodiment of the present invention. The sensor 300 comprises a controller 315 for controlling the current output of a first current source 305 and a second current source 310. The first current source 305 is coupled to a first diode 320, and the second current source 310 is coupled to a second diode 325. Both diode 320 and diode 325 are coupled to ground.

The output ratio of current source 310 to current source 305 is fixed (I2=K*I1) within the range used for measurement, thereby eliminating the variable ($I_2/I_1$) term from the Diode Equation. Each of the current sources 305 and 310 may comprise an array of current source elements, wherein the arrays share a common centroid.

The voltage drop across each of the diodes 320 and 325 are input to a differential amplifier that in turn drives an analog-to-digital converter (ADC). Since voltage measurements are made simultaneously and the difference is quantized, only one quantization error is involved in the measurement.

Figure 3B:
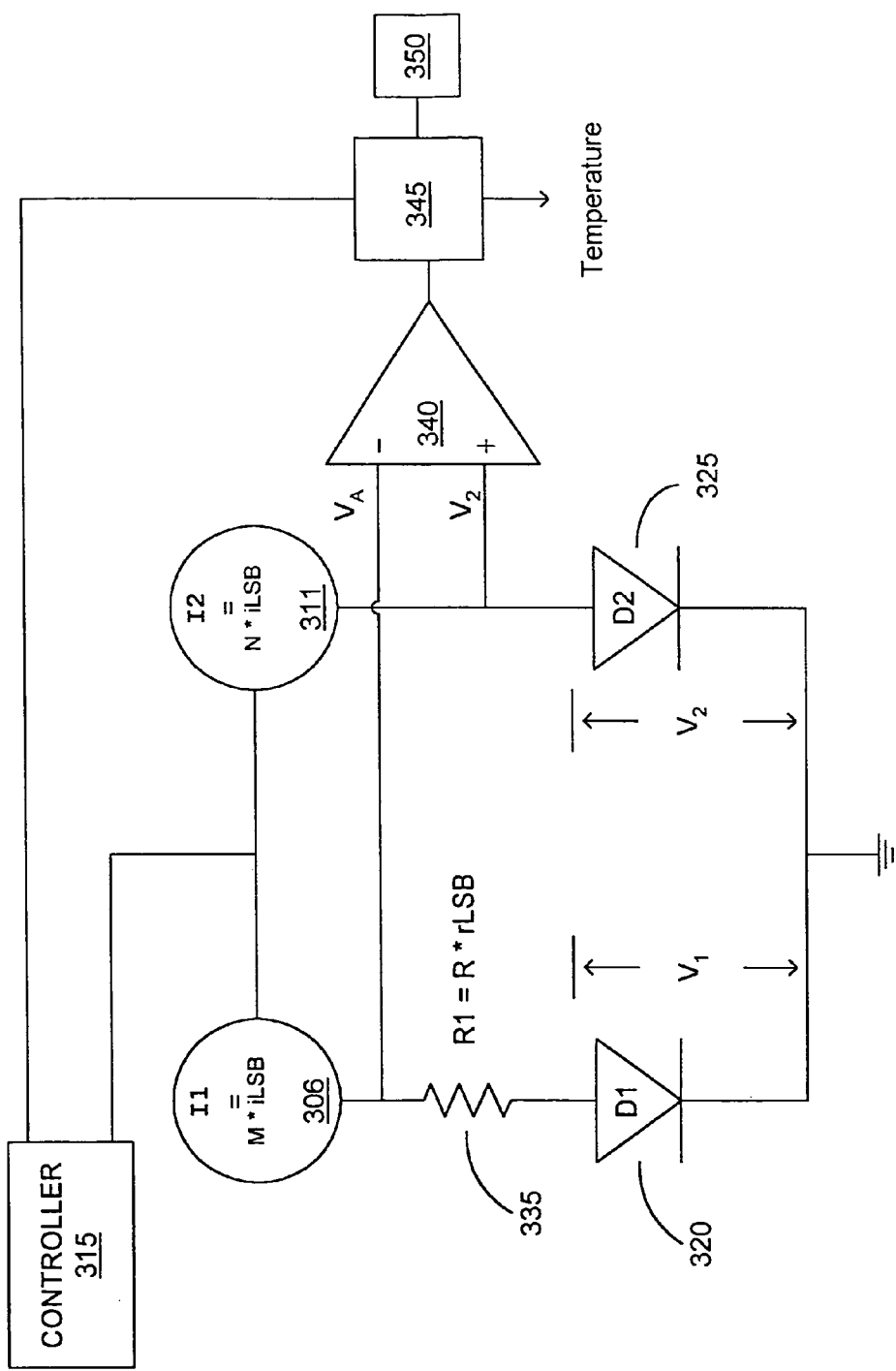
FIG. 3B shows a dual-diode thermal sensor with a sensing series resistor, in accordance with an embodiment of the present claimed invention.

FIG. 3B shows a dual-diode thermal sensor with a sensing series resistor 335, in accordance with an embodiment of the present invention. The output of Controller 315 controls current source 306 and current source 311. Current source 306 and current source 311 each comprises M and N identical small current source elements (iLSB), respectively. In this particular embodiment N is programmable, whereas M is fixed. However, in other embodiments, M may also be programmable.

The controller 315 controls the current level for each of the iLSB current sources that make up sources 306 and 311, and may also control the number of iLSB current sources that are active.

Similarly, resistor R1 335 may be made up of a number of identical small resistors (rLSB). Resistor R1 may be implemented as a programmable resistor by bypass switches (e.g., transistors with low $R_{ds}$ on) for one or more of the rLSB resistors. In this particular embodiment, R1 is considered as having a fixed value, with R rLSB resistors in series.

A high-gain op amp (comparator) 340 is coupled to receive $V_A$ and $V_2$ as inputs. $V_A$ is the sum of the voltage drops across resistor R1 and diode D1 320, and $V_2$ is the voltage drop across diode D2 325. The output of the comparator is coupled to a processor 345 that determines the diode temperature from the value of N established by controller 315, and a set of circuit parameters. N may be adjusted by the controller 315 until the comparator 340 switches, thus establishing the point at which $V_A=V_2$.

Since the entire thermometer 301 may fabricated on-chip, the negative impact of series resistances may be reduced considerably. The on-chip thermometer may also be tested and adjusted to compensate for observed deviations in temperature readings.

In testing, the temperature determined by the processor may be compared to the known value of the integrated circuit during test. A fuse array 350 may be used to program a correction that may be read and applied by the processor. For example an array of four fuses may provide 15 values for correction. In this case, an anticipated error range of +/−3K may thus be divided into 15 corrections that may be applied, ranging from −3K to +3K in increments of 0.4K. More fuses may be used to provide a greater range of corrections and/or a finer resolution of correction.

Figure 4:
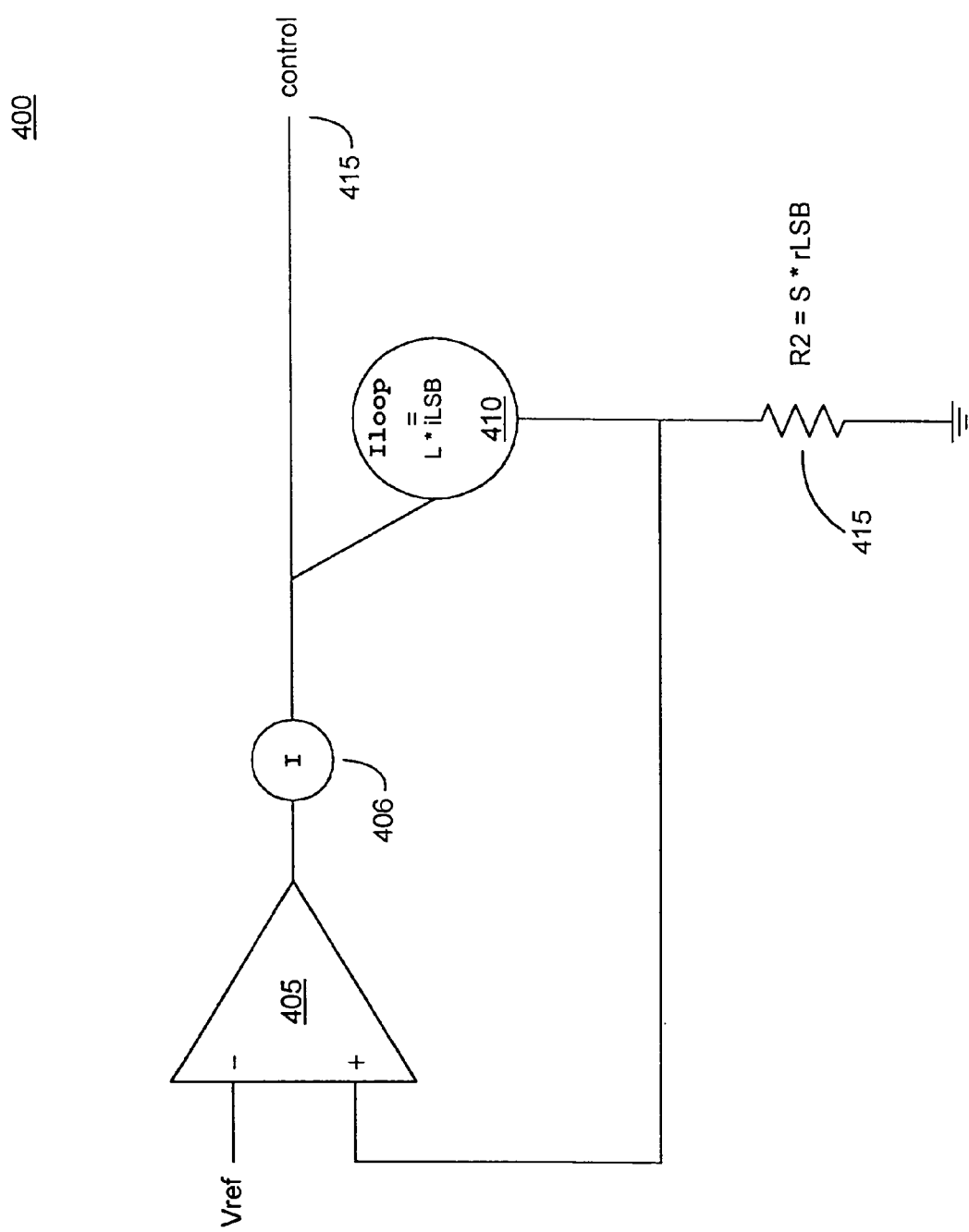
FIG. 4 shows a current source servo controller, in accordance with an embodiment of the present claimed invention.

FIG. 4 shows a current source servo controller 400 that may be used by controller 315 for establishing the current level for each of the iLSB sources. An op amp 405 receives a precision reference voltage (e.g., bandgap reference) as one input. A second input is taken as the voltage across resistor R2 415, providing a servo loop that operates to set the current through R2 such that the voltage drop across R2 is equal to $V_{ref}$.

In one embodiment, resistor R2 comprises a number of identical small resistors (rLSB), as are used in R1. In one embodiment, resistor R2 may be implemented as a programmable resistor by bypass switches (e.g., transistors with low $R_{ds}$ on) for one or more of the rLSB resistors. In this particular embodiment, R2 is considered as having a fixed value, comprising S rLSB resistors in series.

The servo loop current source Iloop 410 is made up of L iLSB current sources in parallel, similar to current sources I1 and I2 of FIG. 3B. In the example of FIG. 4, op amp (operational amplifier) 405 drives a current source 406 that is mirrored by each of the iLSB current sources in Iloop, I1 and I2. Alternatively, each iLSB current source may be a voltage controlled current source that is driven by the output of op amp 405.

Taking into account the configuration of the controller of FIG. 4 and the sensor circuit of FIG. 3B, the voltage drop across resistor R1 335 may be represented as:

$$V_{R1}=I1*R1=M*iLSB*R*rLSB=MR*(iLSB*rLSB)$$

also, $$V_{R2}=Iloop*R2=L*iLSB*S*rLSB,$$

$$V_{ref}=V_{R2}$$

Giving:

$$V_{ref}/LS=iLSB*rLSB$$

$$V_{R1}=(MR/LS)*V_{ref}$$

It is appreciated that the voltage across R1, that is $V_{R1}$, is a known quantity based upon the integer quantities M, R, L and S, and the reference voltage $V_{ref}$. With this in mind, the operation of the system of FIG. 3B is described.

With reference to FIG. 3B, it is seen that since $V_A=V_{R1}+V_1$ and $V_A=V_2$, $V_{R1}=V_2-V_1$, which is one term required for a temperature solution based upon the Diode Equation, with the other term being the current ratio.

Referring again to FIG. 3B, N may be set equal to M by the controller 315, causing the voltage $V_A$ to be greater than $V_2$. The programmable current source I2 311 may then be incrementally adjusted by sequentially switching in additional iLSB current sources in turn. Alternatively, a binomial search or other algorithm may be used to find the value of N at which $V_A=V_2$.

At some point, when a number J of additional iLSB sources have been switched in, $V_2$ will exceed $V_A$, causing the comparator 340 to change state. Although the incremental nature of the current increases prevents determining the exact current at which $V_A=V_2$, a range can be established and the range midpoint used for purposes of calculation. In this case, the current may be taken as $(M+J-½)iLSB$.

Thus, the current ratio $I_2/I_1$ corresponding to the diode voltages $V_1$ and $V_2$ has been determined as $(M+J-½)/M$. Although a specific scheme has been presented for adjusting the current source I2 and equalizing $V_A$ and $V_2$, other starting values and modes of adjustment may be used. Also, another value within the comparator crossover range may used for purposes of calculation.

There are many factors to be considered in the selection of the component sizes and the values of the integers L, M, R, and S. Depending upon the process used for integrated circuit fabrication and the design of the circuit, the transistors (switches and current sources), diodes and resistors of the thermal sensor may vary considerably in size and number.

It is desirable to provide a common centroid for each of the current sources Iloop, I1, and I2. The centroid applies to the layout of the arrays of iLSB sources that make up each of the current sources Iloop, I1, I2. The centroid also applies to the subset of the current sources that may be switched on at a particular time. Thus, there is both a centroid associated with layout, and a centroid associated with operation.

For example, in a circuit for which the diode current limit was desired to be about 400 microamperes, 256 iLSB current sources with a nominal current of roughly 2 to 2.5 microamperes may be used. The maximum current is related to the minimum temperature that is to be measured accurately. Since high temperature accuracy is generally more important for a circuit than low temperature accuracy, the minimum accurate temperature is selected to be about 308K to 318K. It is desired to use a sufficiently high value for N (e.g., 120 to 160) at temperatures of interest (e.g., 340K to 385K) in order to minimize the impact of quantization error.

The error in the temperature measurement will be proportional to the error in the $(V_2-V_1)$. Therefore, it is desirable to make $(V_2-V_1)$ as large as possible relative to the resolution of the comparator. On the other hand, $I_2$ and $V_2$ should be kept from being too large and $I_1$ and $V_1$ should be kept from being to small. In this way, deviation from the Diode Equation can be minimized, and the ideality factor n kept close to 1. In view of these considerations $dV=(V_2-V_1)$ may be targeted to be about 0.085 volts.

It is desired that the current ratio N/M be about 18 for the lowest temperature of interest: $N/M=\exp((q*dV)/(k*T_{min}))$, where N=160, corresponding to the $T_{min}$ of interest. Using dV=0.085 V, $T_{min}$=340K, we get N/M=18.2, M=160/18.2=8.8, giving 9 for the fixed integer value of M.

The $V_{ref}$ level may be obtained from a bandgap reference. In order to reduce noise in reference signal, a voltage divider using two high value resistors may be used to divide the bandgap voltage. For example, two matched resistors may be used to divide a bandgap voltage of 1.175 volts in half to provide a $V_{ref}=0.5875$ volts. The divider output may use a shunt capacitor to filter high frequency noise. The sensor circuit servo may be used to filter low frequency noise.

The relationships for S, L and R may now be examined. From above, $SL=MR*(V_{ref}/dV)=R1*62.2$. To avoid having to make S and L too large, it is preferred that R be set close to 1. Using S=L=8, we get even numbers that help the centroiding for the resistors.

The calculated dV is then: $dV=(MR/SL)*vRef=0.0826$ V. Finally, a nominal value for rLSB is determined from $rLSB=dV/(M*iLSB)$; using a nominal value of 2.0 microamperes for iLSB, rLSB=4.6 kohm. Thus, the solution for T from the Diode Equation becomes:

$$\begin{aligned}T &= (q/nk*dV/\ln(i2/i1))\\ &= (q/nk)*((MR*V_{ref}/SL)/\ln(N/M))\\ &= 11600 \text{ K/V}*(9*(1.175 \text{ V}/2)/64)/\ln(N/9)\\ &= 958.34/\ln(N/9).\end{aligned}$$

TABLE 1

| TEMPERATURE (K) | N | N*iLSB (microamperes) |
|---|---|---|
| 398.0 | 100 | 218 |
| 396.4 | 101 | 220 |
| 370.0 | 120 | 258 |
| 368.8 | 121 | 260 |
| 333.7 | 159 | 336 |
| 333.0 | 160 | 338 |
| 309.0 | 200 | 418 |
| 308.5 | 201 | 420 |

Table 1 shows the calculated temperature for different values of N in accordance with the above solution for T. The step from N=100 to N=101 corresponds to a change in temperature from 398K to 396.4K, or a difference of 1.6K. In keeping with the practice of taking the midpoint of the interval in which the comparator changes state, the temperature measurement for this interval would be 397.2K, with a quantization error of +/−0.8K.

Although the quantization error for the interval between N=200 and N=201 is smaller than that for the interval for N=100 to N=101, it should be noted that the diode current is over 400 microamperes, and ohmic effects may affect the overall accuracy.

Although the simultaneous use of two diodes obviates the need for sequential measurements, the system of the present invention may be used to make sequential measurements using two different current levels. Thus, temperature measurements may be made in a conventional timeframe, but with increased accuracy.

In general, the accuracy requirement for temperature measurements on integrated circuits is on the order of +/−3K. Although the quantization may be reduced by using a 9-bit digital-to-analog converter (DAC) instead of the 8-bit DAC (256 iLSB sources) described herein, the quantization error of 0.8K is already low with respect to industry standards for overall accuracy.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A controller for an on-chip thermometer comprising:
   an operational amplifier having a first input, a second input and an output for coupling to said thermometer;
   a current source coupled to said output of said operational amplifier and to first and second diodes; and
   a resistor having a first terminal and a second terminal, wherein said first terminal is coupled to said current source and to said second input of said operational amplifier;
   wherein said controller is operable to cause a first current in said first diode to be fixed while varying a second current in said second diode responsive to a feedback signal to alter the ratio of said first and second currents.

2. The controller of claim 1, wherein said first input of said operational amplifier is coupled to a voltage reference.

3. The controller of claim 1, wherein said current source comprises an array of current source elements.

4. A current source servo circuit for establishing the current level for current sources used in a system for measuring temperature in an integrated circuit, said current source servo circuit comprising a single output coupled to a fixed current source and also a variable current source.

5. A current source servo circuit according to claim 4 further comprising a voltage source coupled to an input of an operational amplifier.

6. A current source servo circuit according to claim 5 wherein said voltage source is a band gap reference.

7. A current source servo circuit according to claim 5 further comprising a voltage across a resistor coupled to the other input of said operational amplifier.

8. A current source servo circuit according to claim 7 wherein said resistor is related by construction to a resistor in said system for measuring temperature in an integrated circuit.

9. A current source servo circuit according to claim 8 and further for establishing a known voltage in said system for measuring temperature in an integrated circuit.

10. A servo circuit comprising:
    an output coupled to first and second thermal sensing diodes that are coupled to a comparator; and
    an input coupled to said comparator and receiving a feedback signal therefrom;
    wherein said servo circuit is operable to cause a first fixed current in said first diode to establish a first voltage at a first input of said comparator while varying a second current through said second diode to establish a second voltage responsive to said feedback signal.

11. A servo circuit as recited in claim 10, wherein said servo circuit is further operable to cause said first and second voltages to be equal responsive to said feedback signal.

12. A servo circuit as recited in claim 10, wherein said servo circuit is further operable to establish a known voltage, wherein said first voltage comprises said known voltage and a voltage across said first diode.

* * * * *